United States Patent [19]

Hofferber

[11] Patent Number: 4,612,111

[45] Date of Patent: Sep. 16, 1986

[54] CONTROL OF A CRUDE OIL PREHEAT FURNACE

[75] Inventor: James A. Hofferber, Bartlesville, Okla.

[73] Assignee: Phillips Petroleum Company, Bartlesville, Okla.

[21] Appl. No.: 589,364

[22] Filed: Mar. 14, 1984

[51] Int. Cl.[4] .......................... B01D 3/42; C10G 7/12
[52] U.S. Cl. .......................... 208/350; 208/DIG. 1; 208/364; 202/160; 202/206; 196/132; 203/1
[58] Field of Search .................. 208/DIG. 1, 347, 350, 208/352, 364; 203/1; 202/160, 206; 196/132

[56] References Cited

U.S. PATENT DOCUMENTS

| | | | |
|---|---|---|---|
| 2,357,113 | 8/1944 | Houghland et al. | 202/160 |
| 3,112,880 | 12/1963 | Pollock | 196/132 |
| 3,249,518 | 5/1966 | Vautrain et al. | 202/160 |
| 3,249,519 | 5/1966 | Cabbage et al. | 202/160 |
| 3,463,725 | 8/1969 | MacFarlane et al. | 202/160 |
| 3,470,069 | 9/1969 | Bracken et al. | 202/206 |
| 3,793,157 | 2/1974 | Hobbs et al. | 208/DIG. 1 |
| 3,985,623 | 10/1976 | Morgan et al. | 202/160 X |
| 4,046,638 | 9/1977 | Fickel | 202/206 X |
| 4,501,657 | 2/1985 | Nollkamper | 208/350 |

Primary Examiner—Andrew H. Metz
Assistant Examiner—Glenn A. Caldarola
Attorney, Agent, or Firm—French and Doescher

[57] ABSTRACT

The temperature of a crude oil provided from a crude oil preheat furnace to a crude tower is substantially minimized by controlling such temperature so as to maintain a desired minimum overflash flow in the crude tower. Also, the temperature of each of the individual coils in the preheat furnace are balanced with respect to each other. Such minimization and balancing results in substantially optimal utilization of the fuel provided to the preheat furnace which results in considerable economic savings with respect to the operation of the preheat furnace.

6 Claims, 2 Drawing Figures

CONTROL OF A CRUDE OIL PREHEAT FURNACE

This invention relates to control of a preheat furnace. In one aspect this invention relates to method and apparatus for substantially minimizing the temperature of the crude oil feed provided from a crude oil preheat furnace to a crude tower so as to substantially minimize the cost of operating the crude oil preheat furnace. In another aspect, this invention relates to method and apparatus for balancing the individual coil temperatures in the crude oil preheat furnace. In still another aspect this invention relates to method and apparatus for maintaining the flow rate of the crude oil feed through each of the individual coils in the crude oil preheat furnace substantially equal.

Crude oil is typically preheated in a furnace prior to being provided to a crude tower or separation of the various components contained in the crude oil feed. This preheating step represents a substantial economic cost in the processing of a crude oil feed because substantial fuel is required to supply the heat required. It is thus desirable to operate the furnace as economically as possible so as to minimize the cost of processing the crude oil feed.

It is thus an object of this invention to provide method and apparatus for controlling a crude oil preheat furnace so as to substantially minimize the cost of operating the crude oil furnace.

In accordance with the present invention, method and apparatus is provided whereby the temperature of the crude oil provided from a furnace to a crude tower is substantially minimized by controlling such temperature so as to maintain a desired minimum overflash flow in the crude tower. Such minimization of the crude oil temperature results in considerable economic savings with respect to the operation of the preheat furnace.

Also in accordance with the present invention, method and apparatus is provided whereby the temperature of each of the individual coils in the preheat furnace are balanced with respect to each other. Such balancing results in substantially optimal utilization of the fuel provided to the preheat furnace which also contributes to minimizing the cost of operating the preheat furnace.

Other objects and advantages of the invention will be apparent from the foregoing brief description of the invention and the claims as well as the detailed description of the drawings which are briefly described as follows:

The invention is described in terms of a crude oil preheat furnace having four coils. However, the invention is applicable to furnaces having different numbers of coils. As an example, the overflash control aspect of the present invention would be applicable to a furnace having only one coil.

Figure 1:
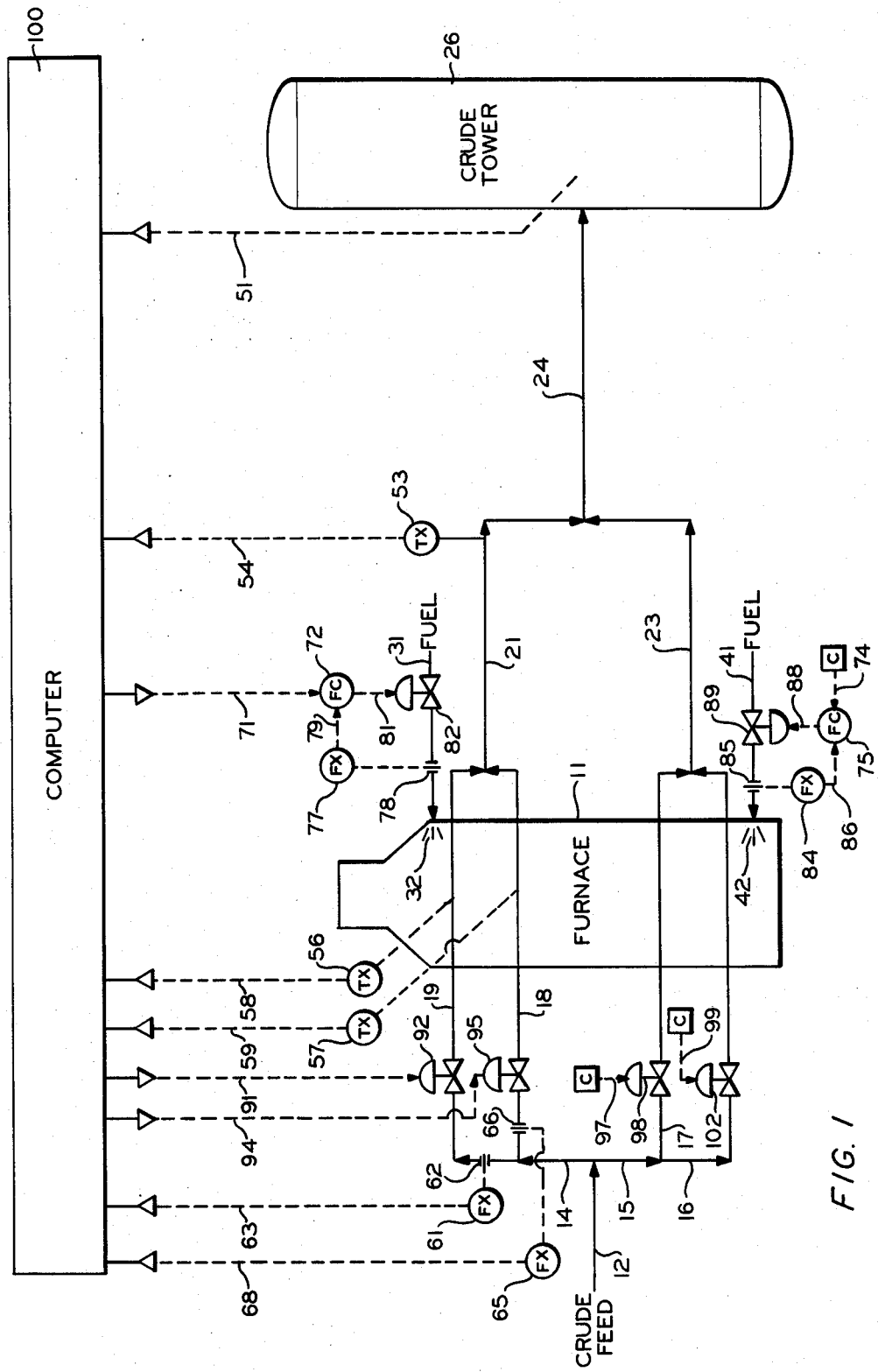
FIG. 1 is a diagrammatic illustration of a crude oil preheat furnace and the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, a crude oil feed is illustrated as flowing through conduit means 12. The crude oil feed flowing through conduit means 12 is divided into two parts which flow through conduit means 14 and 15 respectively. In like manner, the crude oil flowing through conduit means 15 is divided into two parts which flow through conduit means 16 and 17 respectively and the crude oil flowing through conduit means 14 is divided into two parts which flow through conduit means 18 and 19 respectively. The crude oil flowing through conduit means 18 and 19 is recombined at conduit means 21 after passing through the furnace 11. In like manner the crude oil flowing through conduit means 16 and 17 is recombined at conduit means 23 after passing through the furnace 11. The crude oil flowing through conduit means 21 and 23 is combined in conduit means 24 and is provided through conduit means 24 to the crude tower 26.

Conduit means 16, 17, 18 and 19 are considered individual coils of the furnace 11. Fuel is supplied through conduit means 31 to a burner 32 which supplies heat to coils 18 and 19. In like manner, fuel is supplied through conduit means 41 to a burner 42 which supplies heat to coils 16 and 17.

Signal 51, which is provided from the crude tower 26, is representative of the actual overflash flow rate in the crude tower 26. The overflash in the crude tower is the feed which is flashed above the feed tray where the feed enters the crude tower in excess of what is required to satisfy the flow rates required of the side draw streams from the crude tower (the side draw streams are not illustrated since the side draws play no part in the description of the present invention.). Any excess overflash must be compensated for by increasing the heat removal in the crude tower 26 and thus it is desirable to maintain the overflash flow at some low value such as about 3 to about 3.5% above the minimum level required to maintain the desired side draw flow rates. The overflash flow rate can be measured by employing a liquid trap tray immediately above the feed tray and measuring flow in external piping that carries liquid from the trip tray to the feed tray.

The process measurements required for control of the temperature of the crude oil flowing through conduit means 21 and the temperature of the crude oil flowing through conduit means 18 and 19 as well as the flow rate of crude oil through conduit means 18 and 19 is identical to that required for the lower portion of the furnace 11. Thus, for the sake of convenience and clarity, only the process measurements required for the upper coils 18 and 19 will be described hereinafter. However, it should be recognized that these same process measurements would be required for the lower coils 16 and 17.

Temperature transducer 53 in combination with a temperature sensing device such as a thermocouple, which is operably located in conduit means 21, provides an output signal 54 which is representative of the actual temperature of the crude oil flowing through conduit means 21. Signal 54 is provided from the temperature transducer 53 as an input to computer 100.

In like manner, temperature transducers 56 and 57 in combination with temperature sensing devices such as thermocouples, which are operably located in conduit means 19 and 18 respectively, provide output signals 58 and 59 respectively which are representative of the actual temperature of the crude oil flowing through conduit means 19 and 18 respectively. Signal 58 is provided from temperature transducer 56 as an input to computer 100. In like manner, signal 59 is provided from temperature transducer 57 as an input to computer 100.

Flow transducer 61 in combination with the flow sensor 62, which is operably located in conduit means 19, provides an output signal 63 which is representative of the actual flow rate of crude oil through conduit means 19. Signal 63 is provided from the flow transducer 61 as an input to computer 100.

In like manner, flow transducer 65 in combination with the flow snesor 66, which is operably located in conduit means 18, provides an output signal 68 which is representative of the actual flow rate of crude oil through conduit means 18. Signal 68 is provided from the flow transducer 65 as an input to computer 100.

The temperature of the feed flowing through conduit means 24 is essentially maintained by manipulating the flow of fuel through conduit means 31 and 41. The balancing of the temperature between the coils 18 and 19 is accomplished by manipulating the split of the crude oil flowing through conduit means 14. Also, to the extent possible, the flow rate of crude oil through coils 18 and 19 is maintained substantially equal by manipulating the split of the crude oil flowing through conduit means 14. This control is accomplished by utilizing three control signals provided from computer 100 in response to the described process measurements. These control signals are briefly described hereinafter.

Signal 71 is provided from computer 100 as the setpoint input to the flow controller 72. Signal 71 is representative of the flow rate of fuel through conduit means 31 required to maintain the actual temperature of the crude oil flowing through conduit means 21 substantially equal to a temperature which will result in a desired minimum overflash flow in the crude tower 26. In like manner, a similar control signal is provided as control signal 74 from computer 100 to flow controller 75. Manipulation of the temperature of the crude oil flowing through conduit means 21 and 23 in this manner will result in a desired minimum crude oil temperature for the crude oil flowing through conduit means 24 which results in a desired minimum overflash flow rate.

Flow transducer 77 in combination with the flow sensor 78, which is operably located in conduit means 31, provides an output signal 79 which is representative of the actual flow rate of fuel flowing through conduit means 31. Signal 79 is provided as the process variable input to the flow controller 72.

In response to signals 71 and 79, the flow controller 72 provides an output signal 81 which is responsive to the difference between signals 71 and 79. Signal 81 is scaled so as to be representative of the position of the control valve 82, which is operably located in conduit means 31, required to maintain the actual flow rate of the fuel through conduit means 31 substantially equal to a desired flow rate represented by signal 71. Signal 81 is provided from the flow controller 72 as a control signal for the control valve 82 and the control valve 82 is manipulated in response thereto.

Flow transducer 84 in combination with the flow sensor 85, which is operably located in conduit means 41, provides an output signal 86 which is representative of the actual flow rate of fuel flowing through conduit means 41. Signal 86 is provided as the process variable input to the flow controller 75.

In response to signals 74 and 86, the flow controller 75 provides an output signal 88 which is responsive to the difference between signal 74 and 86. Signal 88 is scaled so as to be representative of the position of the control valve 89, which is operably located in conduit means 41, required to maintain the actual flow rate of the fuel through conduit means 41 substantially equal to a desired flow rate represented by signal 74. Signal 88 is provided from the flow controller 75 as a control signal for the control valve 89 and the control valve 89 is manipulated in response thereto.

Control signal 91 is provided from computer 100 to control valve 92 which is operably located in conduit means 19. Signal 91 is scaled so as to be representative of the position of control valve 92 required to maintain the actual temperature of the crude oil flowing through conduit means 19 substantially equal to the temperature of the crude oil flowing through conduit means 18. Also, if required, signal 91 may be biased so as to prevent the flow rate of the crude oil flowing through conduit means 19 from deviating by some desired margin from the average of the crude oil flow rates through conduit means 16, 17, 18 and 19. Control valve 92 is manipulated in response to signal 91.

In like manner, computer 100 provides control signal 94 to control valve 95 which is operably located in conduit means 18. Signal 94 is similar to signal 91 and control valve 95 is manipulated in response to signal 94.

Control signal 97 is provided from the computer to control valve 98 which is operably located in conduit means 17. In like manner, control valve signal 99 is provided from computer 100 to control valve 102 which is manipulated in response to control signal 99. As has been previously stated, the generation of signals 97 and 99 will not be described in detail because this generation is identical to the generation of signals 91 and 94 except for their application to different coils.

Figure 2:
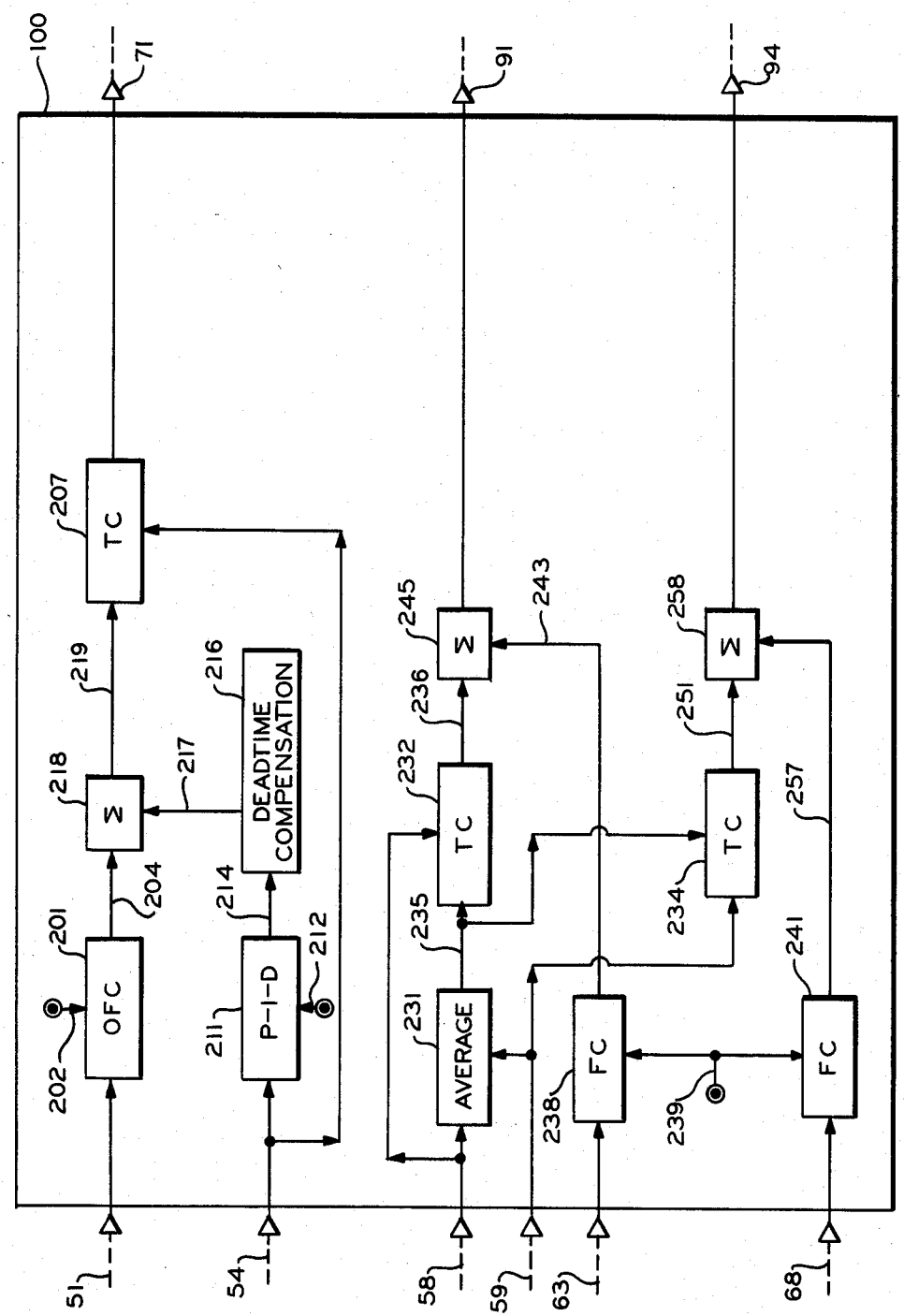
FIG. 2 is a flow diagram of the computer logic utilized to generate the control signals illustrated in FIG. 1 based on the process measurements illustrated in FIG. 1.

Referring now to FIG. 2, signal 51, which is representative of the actual overflash flow rate in the crude tower 26, is provided as the process variable input to the overflash controller 201. The overflash controller 201 is also provided with a set point signal 202 which is representative of the desired overflash flow rate in the crude tower 26.

In response to signals 51 and 202, the overflash controller 201 provides an output signal 204 which is responsive to the difference between signals 51 and 202. Signal 204 is scaled so as to be representative of the temperature of the crude oil flowing through conduit means 24 required to maintain the actual overflash flow rate substantially equal to the desired overflash flow rate represented by signal 202.

In some cases, signal 204 could be supplied directly to the temperature controller 207 as the set point input. An example of one case in which this could be easily done is the case where there is only one coil in the furnace. However, where there are multiple coils in a furnace such as illustrated in FIG. 1, application of signal 204 as the set point to each of the required temperature controllers could result in different exit temperatures for each coil because of temperature controller offset and different process dynamics within each coil. It is thus desirable to bias signal 204 in such circumstances as will be described hereinafter.

Signal 54 which is representative of the actual temperature of the crude oil flowing through conduit means 21 is supplied as the process variable input to controller 211 and also to the temperature controller 207. Controller 211 is also supplied with a set point signal 212 which is representative of the average of the temperatures of the crude oil flowing through conduit means 21 and 23. While this signal is represented as a set point, it should be recognized that this signal would be supplied by process measurement.

In response to signals 54 and 212, controller 211 provides an output signal 214 which is responsive to the difference between signals 54 and 212. Signal 214 is a bias signal which compensates for factors such as temperature controller offset and different process dynamics e.g. delays in different coils. Signal 214 is provided from controller 211 to the dead time compensation block 216.

Because each coil contains significant dead time on the order of about 2 to about 3 minutes, it is preferred to include dead time compensation for stability. The preferred dead time compensation is preferably a well-known Smith predictor. After passing through the dead time compensation block 216, the bias signal represented by signal 214 is supplied as signal 217 to the summing block 218. Signal 204 and 217 are summed in summing block 218 to establish signal 219. Signal 219 is representative of the temperature of the crude oil flowing through conduit means 21 required to maintain a desired crude oil temperature for the crude oil flowing through conduit means 24 when the temperature control of the present invention is applied to all coils and also to maintain the temperature of the crude oil flowing through conduit means 21 substantially equal to the temperature of the crude oil flowing through conduit means 23. Signal 219 is provided from the summing block 218 as the set point input to the temperature controller 207.

In response to signals 54 and 219, the temperature controller 207 provides an output signal 71 which is responsive to the difference between signals 54 and 219. Signal 71 is representative of the flow rate of fuel through conduit means 31 required to maintain the actual temperature of the crude oil flowing through conduit means 21 substantially equal to the desired temperature represented by signal 219 as has been previously described. Signal 71 is provided as an output control signal from computer 100 and is utilized as previously described.

Signal 58, which is representative of the actual temperature of the crude oil flowing through conduit means 19, is provided as a first input to the averaging block 231 and is also provided as the process variable input to the temperature controller 232. In like manner, signal 59 which is representative of the actual temperature of the crude oil flowing through conduit means 18, is provided as a second input to the averaging block 231 and is provided as the process variable input to the temperature controller 234.

The averaging block 231 provides an output signal to 235 which is representative of the average of the temperatures of the crude oil flowing through conduit means 18 and 19. Signal 235 is provided as the set point input to the temperature controller 232 and also as the set point input to the temperature controller 234.

In response to signals 58 and 235, the temperature controller 232 provides a output signal 236 which is responsive to the difference between signals 58 and 235. Signal 236 is scaled so as to be representative of the position of the control valve 92 required to maintain the actual temperature of the crude oil flowing through conduit means 19 substantially equal to the average temperature represented by signal 235.

It is noted that signal 236 could be provided directly to the contol valve 92. However, it is desirable to also maintain the flow rate of crude oil through conduits 18 and 19 substantially equal to the average flow rate of crude oil through all coils of the furnace 11. This is accomplished by summing signal 236 with a bias signal produced as described hereinafter.

Signal 63, which is representative of the actual flow rate of crude oil through conduit means 19, is provided as the process variable input to the flow controller 238. The flow controller 238 is also supplied with a set point signal 239 which is representative of the average flow rate through all of the coils of the furnace 11. Signal 239 is also supplied as a set point input to the flow controller 241 and would be a calculated average of measured variables since all of the flow rates through each of the coils in the furnace 11 would be available to computer 100 if the entire control system were illustrated.

In response to signal 63 and 239, the flow controller 238 provides an output signal 243 which is responsive to the difference between signals 63 and 239. Signal 243 is considered a bias signal. However, because it is not possible to balance both the flows and temperatures due to interactions, flow controller 238 preferably contains a dead band such as 750 barrels per hour. Thus, signal 243 will have a magnitude of 0 unless the flow rate of crude oil through conduit means 19 varies from the average value by more than the dead band value. Only when the actual flow rate varies from the average flow rate by more than the dead band value will signal 243 have a magnitude.

Signals 236 and 243 are summed in a summing block 245 to establish signal 91 which has been previously described. Signal 91 is provided as a control output from computer 100 and is utilized as has been previously described.

In response to signals 59 and 235, the temperature controller 234 provides an output signal 251 which is responsive to the difference between signals 59 and 235. Signal 251 is scaled so as to be representative of the position of control valve 95 required to maintain the actual temperature of the crude oil flowing through conduit means 18 substantially equal to the average temperature represented by signal 235. As was the case with signal 236, signal 251 could be applied directly to the control valve 95 but is preferably biased by summing signal 257, which is generated as previously described for signal 243, with signal 251 in the summing block 258 to establish signal 94. The magnitude of signal 94 has been previously described. Signal 94 is provided as a control output from computer 100 and is utilized as previously described.

In summary, control based on the overflash flow rate in the crude tower is utilized in accordance with the present invention to maintain a minimum temperature for the crude oil feed flowing through conduit means 24. At the same time, the temperature of the crude oil feed flowing through conduit means 21 and 23 is balanced and the temperature of the crude oil feed flowing through coils 16, 17, 18 and 19 is balanced. Also, to the extent possible, the flow rate of crude oil through coils 16, 17, 18 and 19 is balanced. Control in this manner results in a substantially optimum operation of the furnace 11 both from a process standpoint and an economic standpoint.

The invention has been described in terms of a preferred embodiment as illustrated in FIGS. 1 and 2. Control components which can be utilized in the practice of the invention as illustrated in FIG. 1 such as flow transducers 61, 65, 77 and 84; flow controllers 72 and 75; temperature transducers 53, 56 and 57 and control valves 82, 89, 92, 95, 98 and 102 are each well-known, commercially available components such as are illustrated at length in Perry's Chemical Engineers Handbook, 4th Edition, Chapter 22, McGraw-Hill.

While the invention has been described in terms of a preferred embodiment, reasonable variations and modifications are possible by those skilled in the art. Such variations and modifications are within the scope of the present invention, as claimed.

That which is claimed is:

1. Apparatus comprising:
    a furnace having first, second, third and fourth coils;
    a crude tower;
    means for passing a crude oil feed through said first, second, third and fourth coils, wherein the crude oil feed flowing through said first and second coils is combined into a first crude oil stream after passing through said furnace, wherein the crude oil flowing through said third and fourth coils is combined into a second crude oil stream after passing through said furnace and wherein said first crude oil stream and said second crude oil stream are combined into a third crude oil stream which is provided as a feed to said crude tower;
    means for supplying a first fuel stream to said furnace, wherein the combustion of said first fuel stream supplies heat to said first and second coils;
    means for supplying a second fuel stream to said furnace, wherein the combustion of said second fuel stream supplies heat to said third and fourth coils;

means for establishing a first signal representative of the actual overflash flow rate in said crude tower;

means for establishing a second signal representative of the desired overflash flow rate in said crude tower;

means for comparing said first signal and said second signal and for establishing a third signal which is responsive to the difference between said first signal and said second signal, wherein said third signal is scaled so as to be representative of the temperature of said third crude oil stream required to maintain the actual overflash flow rate in said crude tower substantially equal to the desired overflash flow rate represented by said second signal;

means for manipulating the flow rate of said first fuel stream to said furnace and the flow rate of said second fuel stream to said furnace in response to said third signal to thereby maintain the actual temperature of said third crude oil stream substantially equal to the desired temperature of said third crude oil stream represented by said third signal;

a first control valve operably located so as to control the flow of crude oil through said first coil;

a second control valve operably located so as to control the flow of crude oil through said second coil;

a third control valve operably located so as to control the flow of crude oil through said third coil;

a fourth control valve operably located so as to control the flow of crude oil through said fourth coil;

means for establishing a fourth signal representative of the temperature of the crude oil flowing through said first coil;

means for establishing a fifth signal representative of the temperature of the crude oil flowing through said second coil;

means for establishing a sixth signal representative of the average of said fourth signal and said fifth signal;

means for comparing said fourth signal and said sixth signal and for establishing a seventh signal which is responsive to the difference between said fourth signal and sixth signal, wherein said seventh signal is scaled so as to be representative of the position of said first control valve required to maintain the actual temperature of the crude oil flowing through said first coil substantially equal to the average temperature represented by said sixth signal;

means for manipulating said first control valve in response to said fourth signal;

means for comparing said fifth signal and said sixth signal and for establishing an eighth signal which is responsive to the difference between said fifth signal and said sixth signal, wherein said eighth signal is scaled so as to be representative of the position of said second control valve required to maintain the actual temperature of the crude oil flowing through said second coil substantially equal to the average temperature represented by said sixth signal;

means for manipulating said second control valve in response to said eighth signal;

means for establishing a ninth signal representative of the temperature of the crude oil flowing through said third coil;

means for establishing a tenth signal representative of the temperature of the crude oil flowing through said fourth coil;

means for establishing an eleventh signal representative of the average of said ninth signal and said tenth signal;

means for comparing said ninth signal and said eleventh signal and for establishing a twelfth signal which is responsive to the difference between said ninth signal and eleventh signal, wherein said twelfth signal is scaled so as to be representative of the position of said third control valve required to maintain the actual temperature of the crude oil flowing through said third coil substantially equal to the average temperature represented by said eleventh signal;

means for manipulating said third control valve in response to said twelfth signal;

means for comparing said tenth signal and said eleventh signal and for establishing a thirteenth signal which is responsive to the difference between said tenth signal and said eleventh signal, wherein said thirteenth signal is scaled so as to be representative of the position of said fourth control valve required to maintain the actual temperature of the crude oil flowing through said fourth coil substantially equal to the average temperature represented by said eleventh signal; and means for manipulating said fourth control valve in response to said thirteenth signal.

2. Apparatus in accordance with claim 1 wherein said means for manipulating the flow rate of said first fuel stream and said second fuel stream in response to said third signal comprises:

a fifth control valve operably located so as to control the flow of said first fuel stream;

a sixth control valve operably located so as to control the flow of said second fuel stream;

means for establishing a fourteenth signal representative of the actual temperature of said first crude oil stream;

means for comparing said third signal and said fourteenth signal and for establishing a fifteenth signal which is responsive to the difference between said third signal and said fourteenth signal, wherein said fifteenth signal is scaled so as to be representative of the flow rate of said first fuel stream required to maintain the actual temperature of said first crude oil stream substantially equal to the desired temperature represented by said third signal;

means for establishing a sixteenth signal representative of the actual flow rate of said first fuel stream;

means for comparing said fifteenth signal and said sixteenth signal and for establishing a seventeenth signal which is responsive to the difference between said fifteenth signal and said sixteenth signal, wherein said seventeenth signal is scaled so as to be representative of the position of said fifth control valve required to maintain the actual flow rate of said first fuel stream substantially equal to the desired flow rate represented by said fifteenth signal;

means for manipulating said fifth control valve in response to said seventeenth signal;

means for establishing an eighteenth signal representative of the actual temperature of said second crude oil stream;

means for comparing said third signal and said eighteenth signal and for establishing a nineteenth signal which is responsive to the difference between said third signal and said eighteenth signal, wherein said nineteenth signal is scaled so as to be representative of the flow rate of said second fuel stream required to maintain the actual temperature of said second crude oil stream substantially equal to the desired temperature represented by said third signal;

means for establishing a twentieth signal representative of the actual flow rate of said second fuel stream;

means for comparing said nineteenth signal and said twentieth signal and for establishing a twenty-first signal which is responsive to the difference between said nineteenth signal and said twentieth signal, wherein said twenty-first signal is scaled so as to be representative of the position of said sixth control valve required to maintain the actual flow rate of said second fuel stream substantially equal to the desired flow rate represented by said nineteenth signal; and means for manipulating said sixth control valve in response to said twenty-first signal.

3. Apparatus in accordance with claim 1 wherein said means for manipulating the flow rate of said first fuel stream and said second fuel stream in response to said third signal comprises:

a fifth control valve operably located so as to control the flow of said first fuel stream;

a sixth control valve operably located so as to control the flow of said second fuel stream;

means for establishing a fourteenth signal representative of the actual temperature of said first crude oil stream;

means for establishing a fifteenth signal representative of the average of the temperature of said first crude oil stream and the temperature of said second crude oil stream;

means for comparing said fourteenth signal and said fifteenth signal and for establishing a sixteenth signal which is responsive to the difference between said fourteenth signal and said fifteenth signal, wherein said sixteenth signal is scaled so as to be representative of a bias signal;

means for applying deadtime compensation to said sixteenth signal to establish a seventeenth signal;

means for summing said third signal and said seventeenth signal to establish an eighteenth signal which is representative of the desired temperature of said first crude oil stream;

means for comparing said fourteenth signal and said eighteenth signal and for establishing a nineteenth signal which is responsive to the difference between said fourteenth signal and said eighteenth signal, wherein said nineteenth signal is scaled so as to be representative of the flow rate of said first fuel stream required to maintain the actual temperature of said first crude oil stream substantially equal to the desired temperature represented by said eighteenth signal;

means for establishing a twentieth signal representative of the actual flow rate of said first fuel stream;

means for comparing said nineteenth signal and said twentieth signal and for establishing a twenty-first signal which is responsive to the difference between said nineteenth signal and said twentieth signal, wherein said twenty-first signal is scaled so as to be representative of the position of said fifth control valve required to maintain the actual flow rate of said first fuel stream substantially equal to the desired flow rate represented by said nineteenth signal;

means for manipulating said fifth control valve in response to said twenty-first signal;

means for establishing a twenty-second signal representative of the actual temperature of said second crude oil stream;

means for comparing said twenty-second signal and said eighteenth signal and for establishing a twenty-third signal which is responsive to the difference between said twenty-second signal and said eighteenth signal, wherein said twenty-third signal is scaled so as to be representative of a bias signal;

means for applying deadtime compensation to said twenty-third signal to establish a twenty-fourth signal;

means for summing said third signal and said twenty-fourth signal to establish a twenty-fifth signal which is representative of a desired temperature of said second crude oil stream;

means for comparing said twenty-second signal and said twenty-fifth signal and for establishing a twenty-sixth signal which is responsive to the difference between said twenty-second signal and said twenty-fifth signal, wherein said twenty-sixth signal is scaled so as to be representative of the flow rate of said second fuel stream required to maintain the actual temperature of said second crude oil stream substantially equal to the desired temperature represented by said twenty-fifth signal;

means for establishing a twenty-seventh signal representative of the actual flow rate of said second fuel stream;

means for comparing said twenty-sixth signal and said twenty-seventh signal and for establishing a twenty-eighth signal which is responsive to the difference between said twenty-sixth signal and said twenty-seventh signal, wherein said twenty-eighth signal is scaled so as to be representative of the position of said sixth control valve required to maintain the actual flow rate of said second fuel stream substantially equal to the desired flow rate represented by said twenty-sixth signal; and means for manipulating said sixth control valve in response to said twenty-eighth signal.

4. A method for controlling the flow of first and second fuel streams to a furnace having first, second, third and fourth coils, wherein a crude oil feed is passed through said first, second, third and fourth coils, wherein the crude oil feed flowing through said first and second coils is combined into a first crude oil stream after passing through said furnace, wherein the crude oil flowing through said third and fourth coils is combined into a second crude oil stream after passing through said furnace, wherein said first crude oil stream and said second crude oil stream are combined into a third crude oil stream which is provided as a feed to said crude tower, wherein the combustion of said first fuel stream supplies heat to said first and second coils and wherein the combustion of said second fuel stream supplies heat to said third and fourth coils, said method comprising the steps of:

establishing a first signal representative of the actual overflash flow rate in said crude tower;

establishing a second signal representative of the desired overflash flow rate in said crude tower;

comparing said first signal and said second signal and establishing a third signal which is responsive to the difference between said first signal and said second signal, wherein said third signal is scaled so as to be representative of the temperature of said third crude oil stream required to maintain the actual overflash flow rate in said crude tower substantially equal to the desired overflash flow rate represented by said second signal;

manipulating the flow rate of said first fuel stream to said furnace and the flow rate of said second fuel stream to said furnace in response to said third signal to thereby maintain the actual temperature of said third crude oil stream substantially equal to the desired temperature of said third crude oil stream represented by said third signal;

manipulating said second control valve in response to said eighteenth signal;

establishing a fourth signal representative of the temperature of the crude oil flowing through said first coil;

establishing a fifth signal representative of the temperature of the crude oil flowing through said second coil;

establishing a sixth signal representative of the average of said fourth signal and said fifth signal;

comparing said fourth signal and said sixth signal and establishing a seventh signal which is responsive to the difference between said fourth signal and sixth signal, wherein said seventh signal is scaled so as to be representative of the position of a first control valve, operably located so as to control the flow of crude oil through said first coil, required to maintain the actual temperature of the crude oil flowing through said first coil substantially equal to the average temperature represented by said sixth signal;

manipulating said first control valve in response to said seventh signal;

comparing said fifth signal and said sixth signal and establishing an eighth signal which is responsive to the difference between said fifth signal and said sixth signal, wherein said eighth signal is scaled so as to be representative of the position of a second control valve, operably located so as to control the flow of crude oil through said second coil, required to maintain the actual temperature of the crude oil flowing through said second coil substantially equal to the average temperature represented by said sixth signal;

manipulating said second control valve in response to said eighth signal;

establishing a ninth signal representative of the temperature of the crude oil flowing through said third coil;

establishing a tenth signal representative of the temperature of the crude oil flowing through said fourth coil;

establishing an eleventh signal representative of the average of said ninth signal and said tenth signal;

comparing said ninth signal and said eleventh signal and establishing a twelfth signal which is responsive to the difference between said ninth signal and said eleventh signal, wherein said twelfth signal is scaled so as to be representative of the position of said a third control valve, operably located so as to control the flow of crude oil through said third coil, required to maintain the actual temperature of the crude oil flowing through said third coil substantially equal to the average temperature represented by said eleventh signal;

manipulating said third control valve in response to said twelfth signal;

comparing said tenth signal and said eleventh signal and establishing a thirteenth signal which is responsive to the difference between said tenth signal and said eleventh signal, wherein said thirteenth signal is scaled so as to be representative of the position of a fourth control valve, operably located so as to control the flow of crude oil through said fourth coil, required to maintain the actual temperature of the crude oil flowing through said fourth coil substantially equal to the average temperature represented by said eleventh signal; and manipulating said fourth control valve in response to said thirteenth signal.

5. A method in accordance with claim 4 wherein said step of manipulating the flow rate of said first fuel stream and said second fuel stream in response to said third signal comprises:

establishing a fourteenth signal representative of the actual temperature of said first crude oil stream;

comparing said third signal and said fourteenth signal and establishing a fifteenth signal which is responsive to the difference between said third signal and said fourteenth signal, wherein said fifteenth signal is scaled so as to be representative of the flow rate of said first fuel stream required to maintain the actual temperature of said first crude oil stream substantially equal to the desired temperature represented by said third signal;

establishing a sixteenth signal representative of the actual flow rate of said first fuel stream;

comparing said fifteenth signal and said sixteenth signal and establishing a seventeenth signal which is responsive to the difference between said fifteenth signal and said sixteenth signal, wherein said seventeenth signal is scaled so as to be representative of the position of a fifth control valve, operably located so as to control the flow of said first fuel stream, required to maintain the actual flow rate of said first fuel stream substantially equal to the desired flow rate represented by said fifteenth signal;

manipulating said fifth control valve in response to said seventeenth signal;

establishing an eighteenth signal representative of the actual temperature of said second crude oil stream;

comparing said third signal and said eighteenth signal and establishing a nineteenth signal which is responsive to the difference between said third signal and said eighteenth signal, wherein said nineteenth signal is scaled so as to be representative of the flow rate of said second fuel stream required to maintain the actual temperature of said second crude oil stream substantially equal to the desired temperature represented by said third signal;

establishing a twentieth signal representative of the actual flow rate of said second fuel stream;

comparing said nineteenth signal and said twentieth signal and establishing a twenty-first signal which is responsive to the difference between said nineteenth signal and said twentieth signal, wherein said twenty-first signal is scaled so as to be representative of the position of a sixth control valve, operably located so as to control the flow of said second fuel stream, required to maintain the actual flow rate of said second fuel stream substantially equal to the desired flow rate represented by said nineteenth signal; and manipulating said sixth control valve in response to said twenty-first signal.

6. A method in accordance with claim 4 wherein said step of manipulating the flow rate of said first fuel stream and said second fuel stream in response to said third signal comprises:

establishing a fourteenth signal representative of the actual temperature of said first crude oil stream;

establishing a fifteenth signal representative of the average of the temperature of said first crude oil stream and the temperature of said second crude oil stream;

comparing said fourteenth signal and said fifteenth signal and establishing a sixteenth signal which is responsive to the difference between said fourteenth signal and said fifteenth signal, wherein said sixteenth signal is scaled so as to be representative of a bias signal;

applying deadtime compensation to said sixteenth signal to establish a seventeenth signal;

summing said third signal and said seventeenth signal to establish an eighteenth signal which is representative of the desired temperature of said first crude oil stream;

comparing said fourteenth signal and said eighteenth signal and establising a nineteenth signal which is responsive to the difference between said fourteenth signal and said eighteenth signal, wherein said nineteenth signal is scaled so as to be representative of the flow rate of said first fuel stream required to maintain the actual temperature of the said first crude oil stream substantially equal to the desired temperature represented by said eighteenth signal;

establishing a twentieth signal representative of the actual flow rate of said first fuel stream;

comparing said nineteenth signal and said twentieth signal and establishing a twenty-first signal which is responsive to the difference between said nineteenth signal and said twentieth signal, wherein said twenty-first signal is scaled so as to be representative of the position of a fifth control valve, operably located so as to control the flow of said first fuel stream, required to maintain the actual flow rate of said first fuel stream substantially equal to the desired flow rate represented by said nineteenth signal;

manipulating said fifth control valve in response to said twenty-first signal;

establishing a twenty-second signal representative of the actual temperature of said second crude oil stream;

comparing said twenty-second signal and said eighteenth signal and establishing a twenty-third signal which is responsive to the difference between said twenty-second signal and said eighteenth signal, wherein said twenty-third signal is scaled so as to be representative of a bias signal;

applying deadtime compensation to said twenty-third signal to establish a twenty-fourth signal;

summing said third signal and said twenty-fourth signal to establish a twenty-fifth signal which is representative of a desired temperature of said second crude oil stream;

comparing said twenty-second signal and said twenty-fifth signal and establishing a twenty-sixth signal which is responsive to the difference between said twenty-second signal and said twenty-fifth signal, wherein said twenty-sixth signal is scaled so as to be representative of the flow rate of said second fuel stream required to maintain the actual temperature of said second crude oil stream substantially equal to the desired temperature represented by said twenty-fifth signal;

establishing a twenty-seventh signal representative of the actual flow rate of said second fuel stream;

comparing said twenty-sixth signal and said twenty-seventh signal and establishing a twenty-eighth signal which is responsive to the difference between said twenty-sixth signal and said twenty-seventh signal, wherein said twenty-eighth signal is scaled so as to be representative of the position of a sixth control valve, operably located so as to control the flow of said second fuel stream, required to maintain the actual flow rate of said second fuel stream substantially equal to the desired flow rate represented by said twenty-sixth signal; and manipulating said sixth control valve in response to said twenty-eighth signal.

* * * * *